(12) United States Patent
Kim et al.

(10) Patent No.: US 12,489,133 B2
(45) Date of Patent: Dec. 2, 2025

(54) BUTTON-TYPE SECONDARY BATTERY

(71) Applicant: LG ENERGY SOLUTION, LTD., Seoul (KR)

(72) Inventors: Min Gyu Kim, Daejeon (KR); Yong Gon Lee, Daejeon (KR); Je Jun Lee, Daejeon (KR); Jae Won Lim, Daejeon (KR); Geon Woo Min, Daejeon (KR); Min Su Cho, Daejeon (KR); Joo Hwan Sung, Daejeon (KR); Sang Hak Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 571 days.

(21) Appl. No.: 17/908,488

(22) PCT Filed: Aug. 13, 2021

(86) PCT No.: PCT/KR2021/010779
§ 371 (c)(1),
(2) Date: Aug. 31, 2022

(87) PCT Pub. No.: WO2022/059927
PCT Pub. Date: Mar. 24, 2022

(65) Prior Publication Data
US 2023/0343988 A1 Oct. 26, 2023

(30) Foreign Application Priority Data

Sep. 16, 2020 (KR) .................. 10-2020-0119501

(51) Int. Cl.
*H01M 10/04* (2006.01)
*H01M 50/109* (2021.01)
(Continued)

(52) U.S. Cl.
CPC ... *H01M 10/0427* (2013.01); *H01M 10/0431* (2013.01); *H01M 50/109* (2021.01);
(Continued)

(58) Field of Classification Search
CPC ......... H01M 10/0427; H01M 10/0431; H01M 50/109; H01M 50/538; H01M 50/578;
(Continued)

(56) References Cited

U.S. PATENT DOCUMENTS 6,025,091 A 2/2000 Kondo et al.
6,183,902 B1 2/2001 Malay
(Continued)

FOREIGN PATENT DOCUMENTS

CN 101859910 A 10/2010
CN 102318122 A 1/2012
(Continued)

OTHER PUBLICATIONS

WO 2019017382 English Translation (Year: 2019).*
(Continued)

*Primary Examiner* — Jimmy Vo
(74) *Attorney, Agent, or Firm* — Morgan, Lewis & Bockius LLP

(57) ABSTRACT

A button-type secondary battery includes an electrode assembly; a lower can into which the electrode assembly is disposed; and an upper can configured to cover an opening of an upper end of the lower can. A beading part recessed inward is disposed at an upper portion of the lower can. The upper end of the lower can disposed above the beading part has a bent shape and configured to surround an edge end of the upper can so that the upper can and the lower can are coupled to each other.

15 Claims, 3 Drawing Sheets

(51) Int. Cl.
*H01M 50/153* (2021.01)
*H01M 50/342* (2021.01)
*H01M 50/538* (2021.01)
*H01M 50/578* (2021.01)
*H01M 50/583* (2021.01)

(52) U.S. Cl.
CPC ..... *H01M 50/153* (2021.01); *H01M 50/3425* (2021.01); *H01M 50/538* (2021.01); *H01M 50/578* (2021.01); *H01M 50/583* (2021.01)

(58) Field of Classification Search
CPC ........... H01M 50/3425; H01M 50/583; H01M 50/153
See application file for complete search history.

(56) References Cited

U.S. PATENT DOCUMENTS

| | | |
|---|---|---|
| 2008/0166630 A1 | 7/2008 | Okabe et al. |
| 2010/0047666 A1 | 2/2010 | Tatsumi |
| 2010/0136388 A1* | 6/2010 | Kim .................. H01M 50/3425 429/175 |
| 2012/0015224 A1 | 1/2012 | Pytlik et al. |
| 2012/0100406 A1 | 4/2012 | Gaugler |
| 2015/0024290 A1 | 1/2015 | Csrenko et al. |
| 2015/0372339 A1 | 12/2015 | Pytlik et al. |
| 2017/0025703 A1 | 1/2017 | Pytlik et al. |
| 2017/0084901 A1 | 3/2017 | Doo et al. |
| 2017/0162837 A1* | 6/2017 | Sada .................. H01M 50/186 |
| 2017/0187008 A1 | 6/2017 | Gaugler |
| 2017/0346046 A1 | 11/2017 | Song |
| 2017/0365874 A1 | 12/2017 | Pytlik et al. |
| 2018/0013101 A1 | 1/2018 | Gaugler |
| 2020/0099018 A1 | 3/2020 | Gaugler |
| 2020/0185755 A1 | 6/2020 | Pytlik et al. |
| 2020/0194736 A1 | 6/2020 | Gaugler |
| 2020/0194820 A1 | 6/2020 | Pytlik et al. |
| 2020/0212373 A1 | 7/2020 | Gaugler |
| 2020/0212374 A1 | 7/2020 | Gaugler |
| 2020/0212473 A1 | 7/2020 | Pytlik et al. |
| 2020/0212474 A1 | 7/2020 | Pytlik et al. |
| 2021/0167474 A1 | 6/2021 | Kim |
| 2021/0175535 A1 | 6/2021 | Pytlik et al. |
| 2021/0184298 A1 | 6/2021 | Gaugler |
| 2021/0265686 A1 | 8/2021 | Gaugler |
| 2022/0209279 A1 | 6/2022 | Pytlik et al. |

FOREIGN PATENT DOCUMENTS

| | | | |
|---|---|---|---|
| CN | 104505557 | A | 4/2015 |
| CN | 106549132 | A | 3/2017 |
| CN | 210245557 | U | 4/2020 |
| CN | 210245625 | U | 4/2020 |
| CN | 111509148 | A | 8/2020 |
| CN | 111525071 | A | 8/2020 |
| CN | 111525072 | A | 8/2020 |
| CN | 111615766 | A | 9/2020 |
| CN | 111883716 | A | 11/2020 |
| EP | 1092241 | A1 | 4/2001 |
| JP | H07-105933 | A | 4/1995 |
| JP | H09-199106 | A | 7/1997 |
| JP | H10-302737 | A | 11/1998 |
| JP | H11-354148 | A | 12/1999 |
| JP | 2001-210553 | A | 8/2001 |
| JP | 2010-129546 | A | 6/2010 |
| JP | 4977951 | B2 | 7/2012 |
| KR | 10-0950038 | B1 | 3/2010 |
| KR | 10-2011-0124269 | A | 11/2011 |
| KR | 10-2015-0051516 | A | 5/2015 |
| KR | 10-2016-0079724 | A | 7/2016 |
| KR | 10-2017-0035489 | A | 3/2017 |
| KR | 10-2019-0033900 | A | 4/2019 |
| KR | 10-2020-0007562 | A | 1/2020 |
| WO | 2015-125413 | A1 | 8/2015 |
| WO | WO-2019017382 | A1 * | 1/2019 ............. H01L 22/00 |

OTHER PUBLICATIONS

Office Action dated Jun. 7, 2024 issued in Chinese Patent Application No. 202180017134.2.
Office Action dated Sep. 23, 2023 issued in corresponding Chinese patent application 2023092300212560.
Office Action dated Aug. 29, 2023 issued in corresponding Japanese patent application 2022-549800.
Extended European Search Report (EESR) dated Aug. 17, 2023, issued in corresponding European Patent Application No. 21869550.0.
International Search Report (with partial translation) and Written Opinion dated Nov. 23, 2021, for corresponding International Patent Application No. PCT/KR2021/010779.

* cited by examiner

BUTTON-TYPE SECONDARY BATTERY

TECHNICAL FIELD

Cross-Reference to Related Application

The present application claims the benefit of the priority of Korean Patent Application No. 10-2020-0119501, filed on Sep. 16, 2020, which is hereby incorporated by reference in its entirety.

The present invention relates to a button-type secondary battery, and more particularly, to a button-type secondary battery, which is capable of collecting a gas within the battery even if an excessive internal pressure is generated by the gas generated in the battery to prevent the battery from being disassembled or prevent a gas that is harmful to the human body from leaking to the outside of the battery by the gas pressure and to block a flow of current when necessary in a situation in which overcurrent or an internal high pressure occurs, thereby significantly securing safety of the battery.

Background Art

In recent years, the price of energy sources increases due to the depletion of fossil fuels, the interest in environmental pollution is amplified, and the demand for eco-friendly alternative energy sources is becoming an indispensable factor for future life. Accordingly, studies on various power generation technologies such as solar power, wind power, and tidal power are continuing, and power storage devices such as batteries for more efficiently using the generated electrical energy are also of great interest.

Furthermore, as technology development and demand for electronic mobile devices and electric vehicles using batteries increase, the demands for batteries as energy sources are rapidly increasing. Thus, many studies on batteries which are capable of meeting various demands have been conducted.

In particular, in terms of materials, there is a high demand for lithium secondary batteries such as lithium ion batteries and lithium ion polymer batteries having advantages such as high energy density, discharge voltage, and output stability.

The secondary batteries are classified into cylindrical batteries and prismatic batteries, in which an electrode assembly is embedded in a cylindrical or prismatic metal can, and pouch-type batteries, in which an electrode assembly is embedded in a pouch-type case made of an aluminum laminate sheet according to shapes of battery cases. Also, recently, due to the trend of smaller wearable devices, the importance of developing small batteries such as button-type secondary batteries has been highlighted.

FIG. 1 is a cross-sectional view of a button-type secondary battery according to the related art.

Referring to FIG. 1, a button-shaped secondary battery 10 according to the related art has a shape that is divided into upper and lower housings and has a structure in which an upper cylindrical can 4 and a lower cylindrical can 3 are press-fitted. That is, an outer diameter of the lower cylindrical can 3 is slightly larger than that of an upper portion thereof to realize the press-fitting. In the case of the press-fitting, it is the principle that a shape of the button-type secondary battery is maintained due to friction force due to the press-fitting. Also, in the button-shaped secondary battery according to the related art, the upper can 4 and the lower can 3 are manufactured to match a size of an internal electrode assembly 1 so as to be press-fitted with each other, and thus, there is no available space therein.

However, in this configuration, when the internal pressure increases due to generation of an internal gas, etc., there is no fixing force other than frictional force, and thus, there is a high possibility that the upper can 4 and the lower can 3 are separated from each other. If the internal pressure rises, the internal pressure may rise due to side reactions and also rise during a normal cycle, but if the internal pressure excessively rises, the upper can and the lower can are separated from each other and thus may not function as a battery.

Therefore, a battery capable of collecting a gas caused by the internal reaction of the battery is required, and studies on a product in which the upper and lower cans are not separated from each other is also required.

DISCLOSURE OF THE INVENTION

Technical Problem

The present invention has been devised to solve the above problems, and an object of the present invention is to collect a gas within the battery even if an excessive internal pressure is generated by the gas generated in the battery so as to prevent the battery from being disassembled or prevent a gas that is harmful to the human body from leaking to the outside of the battery by the gas pressure and to block a flow of current when necessary in a situation in which overcurrent or an internal high pressure occurs, thereby significantly securing safety of the battery.

Technical Solution

A button-type secondary battery according to the present invention relates to a button-type secondary battery having a diameter greater than a height thereof, the button-type secondary battery including: an electrode assembly; a lower can into which the electrode assembly is inserted; and an upper can configured to cover an opening of an upper end of the lower can, wherein a beading part recessed inward is provided in an upper portion of the lower can, and the upper end of the lower can disposed above the beading part has a bent shape and configured to surround an edge end of the upper an so that the upper can and the lower can are coupled to each other.

An insulator may be interposed between the edge end of the upper can and the bent portion of the upper end of the lower can, and the insulator may be made of a polybutylene terephthalate (PBT) material.

The upper can may have a circular shape in a plan view and have a shape in which a central portion thereof further protrudes upward than the edge end of the upper end so that the edge end and the central portion of the upper can are stepped with respect to each other.

A center hole may be formed in a center of the electrode assembly, and a center pin may be provided in the center hole to fully fill the center hole.

A collection space in which an internal gas is collected may be provided between the upper can and the electrode assembly.

The button-type secondary battery may further include an electrode tab configured to connect an electrode of the electrode assembly to the upper can, wherein the electrode tab may have one end connected to the electrode of the electrode assembly, and the electrode tab may have the other end connected to a bottom surface of the upper can in a C-shape.

A collection space in which an internal gas is collected may be provided between the upper can and the electrode assembly, the button-type secondary battery may further include a vent unit including: a vent body having a shape that crosses the collection space; and a vent outer edge extending outward from an end of the vent body to be in contact with a bottom surface of the edge end of the upper can.

The vent body may include a rupture notch having a recessed groove shape in an outer edge portion thereof.

The collection space may include a first collection space formed between a top surface of the vent body and a bottom surface of the upper can and a second collection space formed between a bottom surface of the vent body and a top surface of the electrode assembly.

The button-type secondary battery may further include an electrode tab configured to connect an electrode of the electrode assembly to the vent unit, wherein the electrode tab may have one end connected to the electrode of the electrode assembly, and the electrode tab may have the other end connected to a bottom surface of the vent body in a C-shape.

A point at which the other end of the electrode tab and the bottom surface of the vent body are bonded to each other may be disposed inside the rupture notch.

The rupture notch may be ruptured when a gas generated in the lower can exceeds a predetermined pressure.

When the rupture notch is ruptured, the vent body and the vent outer edge may be separated from each other, and a flow of current between the electrode assembly and the upper can may be blocked.

When the rupture notch is ruptured, the internal gas may move from the second collection space to the first collection space.

A center hole may be formed in a central portion of the electrode assembly, a center pin may be provided in the center hole, and the center pin may be a porous center pin in which a plurality of internal center pin spaces are formed.

Advantageous Effects

The button-type secondary battery according to the present invention may relate to the button-type secondary battery, in which the length of the diameter is greater than the height, including the electrode assembly, the lower can into which the electrode assembly is inserted, and the upper can covering the opening of the upper end of the lower can. Here, the beading part recessed inward may be provided in the upper portion of the lower can, and the upper end of the lower can disposed above the beading part may have the bent shape and surrounds the edge end of the upper can so that the upper can and the lower can are coupled to each other. Therefore, even if an excessive internal pressure is generated by the gas generated in the battery, the gas generated in the battery may be collected to prevent the battery from being disassembled or prevent the gas that is harmful to the human body from leaking to the outside of the battery by the gas pressure and to block the flow of current when necessary in the situation in which the overcurrent or the internal high pressure occurs, thereby significantly securing the safety of the battery.

MODE FOR CARRYING OUT THE INVENTION

Figure 1:
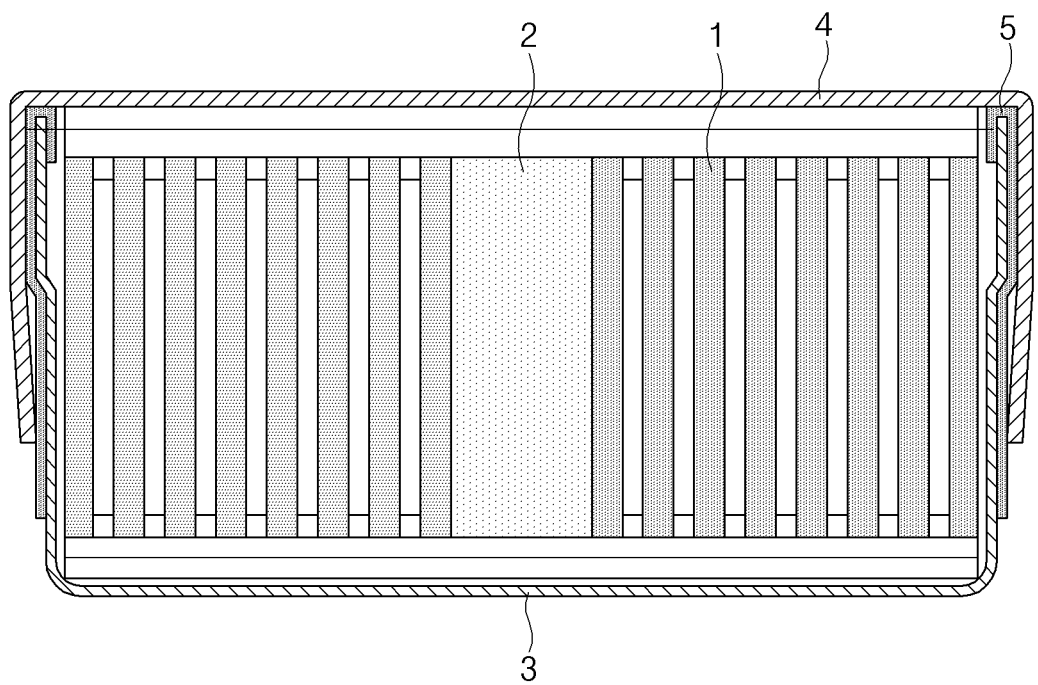
FIG. 1 is a cross-sectional view of a button-type secondary battery according to the related art.

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known technologies that may unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Embodiment 1

Figure 2:
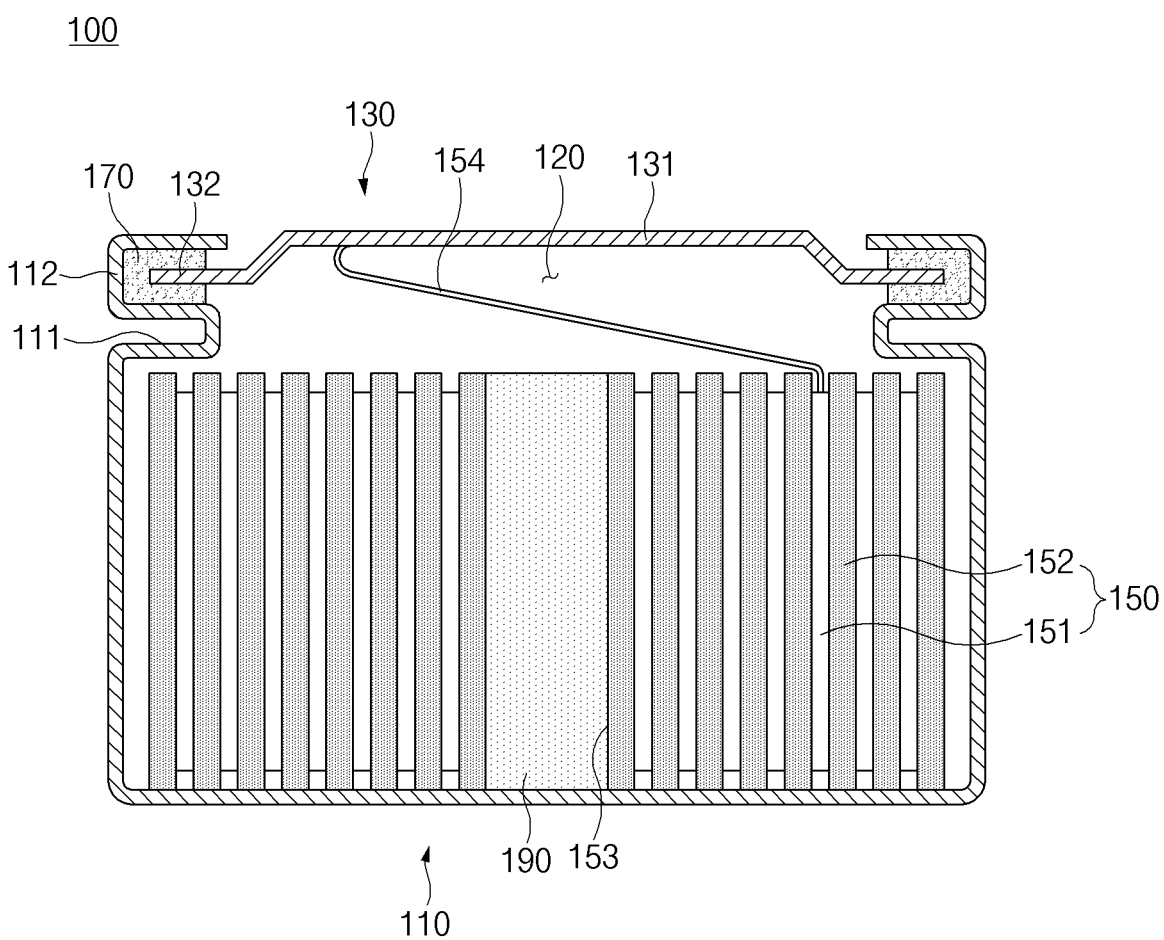
FIG. 2 is a cross-sectional view of a button-type secondary battery according to Embodiment 1 of the present invention.

FIG. 2 is a cross-sectional view of a button-type secondary battery according to Embodiment 1 of the present invention.

Referring to FIG. 2, a button-type secondary battery 100 according to Embodiment 1 of the present invention may be a battery having a cylindrical shape, and a diameter of the cylindrical battery may be larger than a height of the battery. Also, the button-type secondary battery 100 according to Embodiment 1 of the present invention may include an electrode assembly 150, a lower can 110, and an upper can 130. The electrode assembly 150 may have a shape in which electrodes 151 and separators 152 are alternately stacked to be wound.

Also, the electrode assembly 150 may be inserted into the lower can 110. The lower can 110 may have an opened upper end in a cylindrical shape. The electrode assembly 150 may be in the form of a jelly roll. When the electrode assembly 150 is disposed in the lower can 110, a winding axis of the electrode assembly 150 may be disposed in a shape that is perpendicular to the ground. The upper can 130 may have a plate shape or a stepped plate shape. In addition, the upper can 130 may have a shape that covers the opening of the upper end of the lower can 110.

An inwardly recessed beading part 111 may be provided in an upper portion of the lower can 110. The beading part 111 may be formed on an entire circumference along an outer circumferential surface of the lower can 110. Referring to FIG. 2, the beading part 111 may have a cross-sectional shape that is recessed in a shape that is angled at an angle of 90 degrees or may have a shape that is recessed in the form of a curved surface, unlike the drawing. In the button-type secondary battery 100 according to Embodiment 1 of the present invention, an upper end 112 of the lower can disposed above the beading part 111 may have a bent shape, and thus, the upper can 130 and the lower can 110 may be coupled to each other while the lower can 110 surrounds an edge end of the upper can 130. An insulator 170 may be interposed between the edge end 132 of the upper can and the bent portion of the upper end 112 of the lower can.

The upper end 112 of the lower can may be bent or curved. The upper end 112 of the lower can may have a shape in which the edge end 132 of the upper end is inserted into the bent shape. The upper end 112 of the lower can may hold the edge end 132 of the upper can and the insulator 170 together in a press-fitting manner. Since the upper can 130 and the lower can 110 are coupled to each other by applying a pressure, the upper can 130 may not be easily separated from the lower can 110, and thus strong coupling may be possible. Thus, even if an excessive internal pressure is generated by a gas generated inside the battery, the gas that is harmful to the human body may not leak out of the battery, and an electrolyte inside the battery may be prevented from leaking out of the battery.

Here, the insulator 170 may be made of a polybutylene terephthalate (PBT) material. The PBT material may have good mechanical properties, and in particular, high rigidity to realize a battery having excellent airtightness and durability.

In the button-type secondary battery 100 according to Embodiment 1 of the present invention, the upper can 130 may have a circular shape in a plan view and have a shape in which a central portion 131 thereof further protrudes upward than the edge end 132 in the cross-section view as illustrated in FIG. 2 so that the edge end 132 and the central portion 131 of the upper can are stepped with respect to each other. Due to this shape, a collection space 120, in which the internal gas is collected, may be provided between the upper can 130 and the electrode assembly 150. The collection space 120 may be provided in the battery so that even if an excessive internal pressure is generated by the gas generated inside the battery, the gas may be collected inside the battery, and thus, the battery may not be disassembled by the gas pressure (that is, according to the present invention, the battery is not easily disassembled by the gas pressure), or the gas that is harmful to the human body may not leak to the outside of the battery.

A center hole 153 may be formed in a center of the electrode assembly 150. In addition, a center pin 190 may be provided in the center hole 153 to fully fill the center hole 153. When the center pin 190 is formed to completely fill the center hole 153, the electrode assembly 150 may be prevented from being deformed. A core part of the electrode assembly 150, which has particularly weak supporting force, may be deformed by internal heat and internal gas generated when the battery reaction proceeds. When the core part is deformed as described above, the separator 152 that separates a positive electrode from a negative electrode may be deformed, and thus, a short-circuit accident such as contact of the positive electrode and the negative electrode may occur. However, in the present invention, since the center pin 190 is provided to fully fill the center hole 153, the occurrence of such the short-circuit accident may be prevented in advance.

The button-type secondary battery 100 according to Embodiment 1 of the present invention may further include an electrode tab 154 connecting the electrode 151 of the electrode assembly 150 to the upper can. The electrode tab 154 may have one end connected to the electrode 151 of the electrode assembly 150 and the other end connected to a bottom surface of the upper can 130 in a C-shape. As illustrated in FIG. 2, when the electrode tab 154 is connected to the bottom surface of the upper can 130 in the C-shape, the electrode tab 154 may have predetermined elasticity against an impact such as drop, and thus, even if the impact such as the drop occurs, the electrode tab 154 may be effectively prevented from being broken.

Embodiment 2

Figure 3:
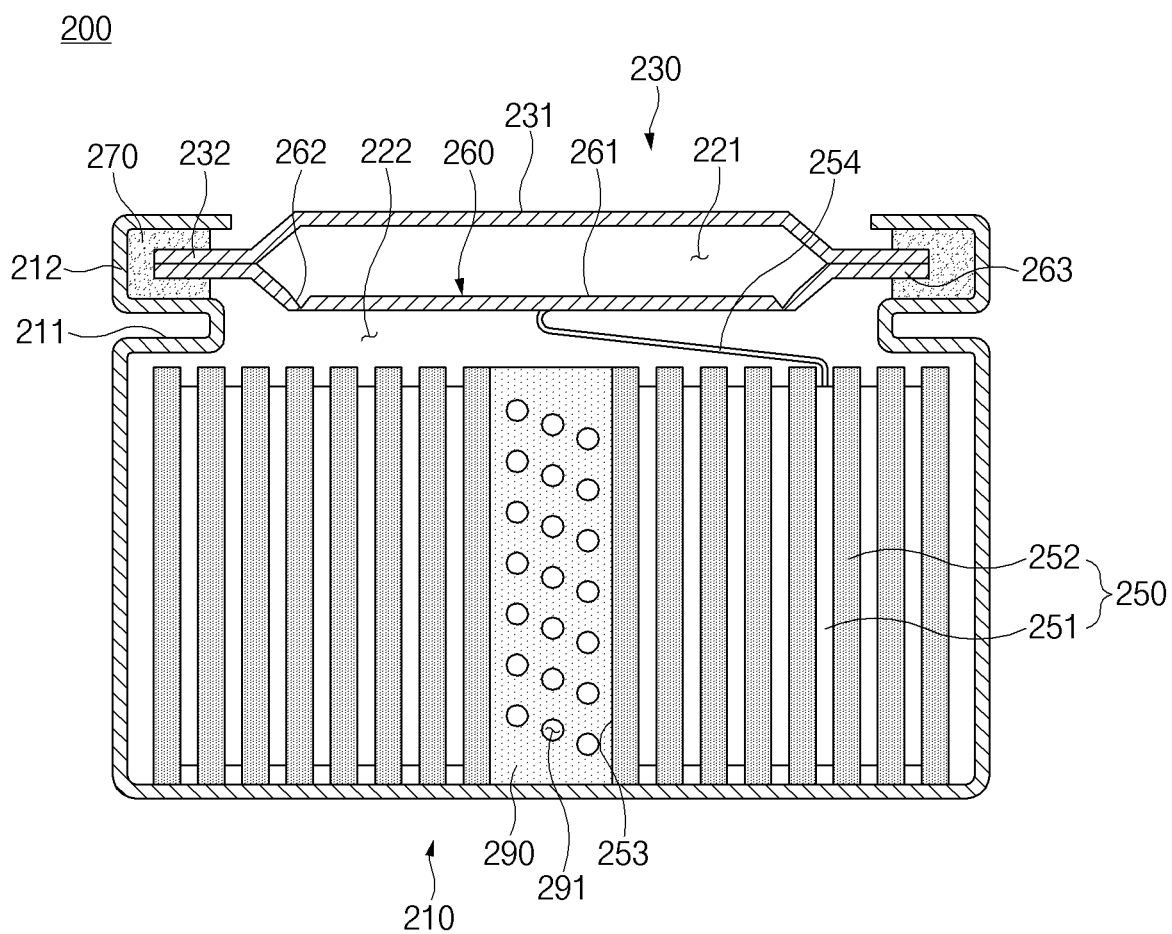
FIG. 3 is a cross-sectional view of a button-type secondary battery according to Embodiment 2 of the present invention.

FIG. 3 is a cross-sectional view of a button-type secondary battery according to Embodiment 2 of the present invention.

Embodiment 2 of the present invention is different from Embodiment 1 in that a vent unit 260 that is capable of blocking a flow of current when necessary in a situation in which overcurrent or an internal high pressure occurs and is capable of additionally providing an additional space, in which the gas is collected, in the battery when the excessive internal pressure occurs due to the gas generated in the battery is further provided.

The contents that are duplicated with Embodiment 1 will be omitted as much as possible, and Embodiment 2 will be described with a focus on the differences. That is, it is obvious that the contents that are not described in Embodiment 2 may be regarded as the contents of Embodiment 1 if necessary.

Referring to FIG. 3, a button-type secondary battery 200 according to Embodiment 2 of the present invention may further include the vent unit 260. The vent unit 260 may include a vent body 261 and a vent outer edge 263.

Similar to Embodiment 1, in Embodiment 2, a collection space 220 in which an internal gas is collected may be provided between an upper can 230 and an electrode assembly 250. However, in Embodiment 2, the vent body 261 may have a shape that crosses the collection space 220. Thus, the vent unit 260 may have a shape that divides the collection space 220 into two portions. In addition, the vent outer edge 263 may extend outward from an end of the vent body 261 to be in contact with a bottom surface of an edge end 232 of the upper can.

According to this structure, in the button-type secondary battery 200 according to Embodiment 2 of the present invention, the collection space 220 may include a first collection space 221 formed between a top surface of the vent body 261 and a bottom surface of the upper can 230 and a second collection space 222 formed between a bottom surface of the vent body 261 and a top surface of the electrode assembly 250.

In addition, the vent body 261 may include a rupture notch 262 having a recessed groove shape in an outer edge portion thereof. The rupture notch 262 may have a groove shape that is recessed to be thinner than other parts, and the shape of the rupture notch 262 may have a triangular shape, a square shape, or a semicircle shape. Initially, the gas may be generated in the battery to fill the second collection space 222. Here, if the internal pressure gradually increases, the rupture notch 262 formed at the vent body 261 may not endure the pressure and thus be ruptured. As a result, the internal gas may move from the second collection space 222 to the first collection space 221.

The button-type secondary battery 200 according to Embodiment 2 of the present invention may further include an electrode tab 254 connecting an electrode 251 of the electrode assembly 250 to the vent unit 260. The electrode tab 254 may have one end connected to the electrode 251 of the electrode assembly 250 and the other end connected to a bottom surface of the vent body 261 in a C-shape. In Embodiment 1, the other end of the electrode tab 254 is connected to the bottom surface of the upper can 230 in the C shape, but in Embodiment 2, the other end of the electrode tab 254 is not connected to the upper can 230 but connected to the vent unit 260.

As illustrated in FIG. 3, when the electrode tab 254 is connected to the bottom surface of the vent body 261 in the C-shape, the electrode tab 254 may have predetermined elasticity against an impact such as drop, and thus, even if the impact such as the drop occurs, the electrode tab 154 may be effectively prevented from being broken.

A point at which the other end of the electrode tab 254 and the bottom surface of the vent body 261 are bonded to each other may be disposed inside the rupture notch 262. The rupture notch 262 may be ruptured when the gas generated in the lower can 210 exceeds a predetermined pressure. When the rupture notch 262 is ruptured, the vent body 261 and the vent outer edge 263 may be separated from each other, and a flow of current connected between the electrode assembly 250 and the upper can 230 may be blocked.

Particularly, in the button-type secondary battery 200 according to Embodiment 2 of the present invention, a process of an operation after the generation of the internal gas may be as follows. That is, when the internal gas is generated due to a side reaction of the battery, since the gas is a light gas, the gas may ascend to fill the second collection space 222. Thereafter, when the second collection space 222 is fully filled, and thus, the internal pressure of the battery gradually increases, the rupture notch 262 formed at the vent body 261 of the vent unit 260 is ruptured at a predetermined pressure or higher.

When the rupture notch 262 is ruptured, the vent body 261 and the vent outer edge 263 may be separated from each other. The gas pressure may press the vent body 261 upward, and when the reaction of the gas pressure and gravity act, the vent body 261 may descend again, and in this process, the vent body 261 and the vent outer edge 263 may be completely separated from each other.

The vent body 261 may have a flat plate shape without a bent or recessed portion during a normal operation. In addition, the vent body 261 and the vent outer edge 263 may be connected to each other in a state in which an outer circumferential of the vent body 261 and an inner circumference of the vent outer edge 263 may have the same diameter. However, when the rupture notch 262 of the vent unit 260 is ruptured by the excessive internal pressure, the vent body 261 may be deformed into a recessed or protruding form, and at least a portion of the vent body 261 may be deformed. As a result, the diameter of the outer circumference of the vent body 261 may be less than that of the inner circumference of the vent outer edge 263 (meaning comparing the diameters of orthographic projection), and thus, the vent body 261 may pass through the outer circumference of the vented outer edge 263 to descend. In this manner, the vent body 261 and the vent outer edge 263 may be completely separated from each other.

However, in the present invention, the upper can 230 serving as an external terminal may be directly connected only to the vent outer edge 263, but is not directly connected to the vent body 261. Thus, since the point at which the electrode tab 254 and the vent body 261 are bonded to each other is disposed inside the rupture notch 262 (inside a circle formed by the rupture notch in the plan view), when the vent body 261 is completely separated from the vent outer edge 263, the flow of current between the electrode assembly 250 and the upper can 230 may be blocked. When the current flow is blocked in this manner, the operation by the battery may be stopped, and thus, safety of the battery may be ensured in the situation in which the overcurrent or the internal high voltage occurs.

When the rupture notch 262 is ruptured, the internal gas may move from the second collection space 222 to the first collection space 221. Here, the first collection space 221 that is a space between the vent unit 260 and the upper can 230 may be an additional space, and in particular, when the rupture of the vent unit due to the excessive pressure and the blocking of the current occur, the first collection space 221 may serve as an available space to prevent the gas from leaking to the outside of the battery (since a hole is not formed in the upper end, the gas does not pass through the upper can and thus does not leak to the outside). If the gas leaks to the outside the battery, the gas may harm the human body due to nature of batteries used in wearable electronic devices, the blocking of the current due to the excessive gas may be possible, but the gas may not leak to the outside of the battery.

In the button-type secondary battery 200 according to Embodiment 2 of the present invention, a center hole 253 may be formed in a center of the electrode assembly 250, and a center pin 290 may be provided in the center hole 253. However, the center pin 290 according to Embodiment 2 of the present invention may be a porous center pin 290 in which a plurality of internal center pin spaces 291 are formed, unlike Embodiment 1. The internal center pin spaces 291 formed in the center pin may be formed in rows at a predetermined interval.

When the porous center pin 290 is used, liquid injectability of the electrolyte may be secured. That is, as an amount of electrolyte contained in the battery increases, capacity and performance of the battery may be improved. When the porous center pin 290 is used, a larger amount of electrolyte may be injected when compared to the related art.

Of course, even with the porous center pin 290, the center pin 290 may be formed to completely fill the center hole 253, thereby securing rigidity against an external mechanical pressure. That is, even in Embodiment 2, the center pin 290 formed to fully fill the center hole 253 may be inserted to prevent the electrode assembly 250 from being deformed.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

100: Button-type secondary battery
110: Lower can
111: Beading part
112: Upper end of lower can
120: Collection space
130: Upper can
131: Central portion
132: Edge end of upper can
150: Electrode assembly
151: Electrode
152: Separator
153: Center hole
154: Electrode tab
170: Insulator
190: Center pin
200: Button-type secondary battery
210: Lower can 211: Beading part
212: Upper end of lower can
220: Collection space
221: First collection space
222: Second collection space
230: Upper can
231: Central portion
232: Edge end of upper can
250: Electrode assembly
251: Electrode
252: Separator
253: Center hole
254: Electrode tab
260: Vent unit
261: Vent body
262: Rupture notch
263: Vent outer edge
270: Insulator
290: Center pin
291: Internal space of center pin

The invention claimed is:

1. A button-type secondary battery comprising:
an electrode assembly;
a lower can into which the electrode assembly is disposed;
an upper can configured to cover an opening of an upper end of the lower can, and
a vent unit disposed below the upper can, the vent unit including a vent body, a vent outer edge extending outward from an end of the vent body, and a rupture notch between the vent body and the vent outer edge,
wherein the vent outer edge is in contact with a bottom surface of an edge end of the upper can,
wherein a beading part recessed inward is disposed at an upper portion of the lower can,
wherein the upper end of the lower can disposed above the beading part has a bent shape and configured to surround the edge end of the upper can and the vent outer edge so that the upper can and the lower can are coupled to each other,
wherein a first collection space is defined above the vent unit and below a bottom surface of the upper can, and a second collection space is defined below the vent unit and above the electrode assembly, the vent unit dividing the first collection space from the second collection space,
wherein the rupture notch is configured to be ruptured when a gas in the second collection space exceeds a predetermined pressure,
wherein gas cannot move from the second collection space to the first collection space in an unruptured state of the vent unit, and gas can move from the second collection space to the first collection space in a ruptured state of the vent unit, and
wherein, in the ruptured state of the vent unit, gas is prevented from leaking to an outside of the button-type secondary battery.

2. The button-type secondary battery of claim 1, wherein an insulator is interposed between the edge end of the upper can and the bent portion of the upper end of the lower can, and
wherein the insulator includes a polybutylene terephthalate (PBT) material.

3. The button-type secondary battery of claim 1, wherein the upper can has a circular shape in a plan view and has a shape in which a central portion thereof further protrudes upward more than the edge end of the upper end so that the edge end and the central portion of the upper can are stepped with respect to each other.

4. The button-type secondary battery of claim 1, wherein a center hole is defined in a center of the electrode assembly, and
wherein a center pin is disposed in the center hole to fully fill the center hole.

5. The button-type secondary battery of claim 1, further comprising an electrode tab configured to connect an electrode of the electrode assembly to the upper can,
wherein the electrode tab has one end connected to the electrode of the electrode assembly, and
wherein the electrode tab has the other end connected to a bottom surface of the upper can in a C-shape.

6. The button-type secondary battery of claim 1, wherein the vent body comprises a rupture notch having a recessed groove shape in an outer edge portion thereof.

7. The button-type secondary battery of claim 1, further comprising an electrode tab configured to connect an electrode of the electrode assembly to the vent unit,
wherein the electrode tab has one end connected to the electrode of the electrode assembly, and
wherein the electrode tab has the other end connected to a bottom surface of the vent body in a C-shape.

8. The button-type secondary battery of claim 7, wherein a point at which the other end of the electrode tab and the bottom surface of the vent body are bonded to each other is disposed inside the rupture notch.

9. The button-type secondary battery of claim 8, wherein the rupture notch is configured to be ruptured when a gas generated in the lower can exceeds a predetermined pressure.

10. The button-type secondary battery of claim 9, wherein the vent body and the vent outer edge are configured to be separated from each other, and a flow of current between the electrode assembly and the upper can is configured to be blocked when the rupture notch is ruptured.

11. The button-type secondary battery of claim 9, wherein the collection space is configured so that the internal gas moves from the second collection space to the first collection space when the rupture notch is ruptured.

12. The button-type secondary battery of claim 1, wherein a center hole is defined in a central portion of the electrode assembly, wherein a center pin is disposed in the center hole, and wherein the center pin includes a porous center pin in which a plurality of internal center pin spaces are formed.

13. The button-type secondary battery of claim 1, wherein the button-type secondary battery has a diameter greater than a height thereof.

14. The button-type secondary battery of claim 1, wherein, in the ruptured state of the vent unit, the vent body and the vent outer edge are separated from each other.

15. The button-type secondary battery of claim 1, wherein the vent outer edge is in electrical contact with the bottom surface of an edge end of the upper can, and an electrode of the electrode assembly is electrically connected to the vent body so that current flow between the electrode assembly and the upper can is possible in the unruptured state of the vent unit, and
wherein, in the ruptured state of the vent unit, the vent body and the vent outer edge are separated from each other so that current flow between the electrode assembly and the upper can is blocked.

* * * * *